March 23, 1948.　　　C. H. JOHNSON　　　2,438,217
METHOD FOR ELIMINATION OF PERIODIC STRAY SIGNALS FROM SEISMIC SIGNALS
Filed June 30, 1944　　　2 Sheets-Sheet 1
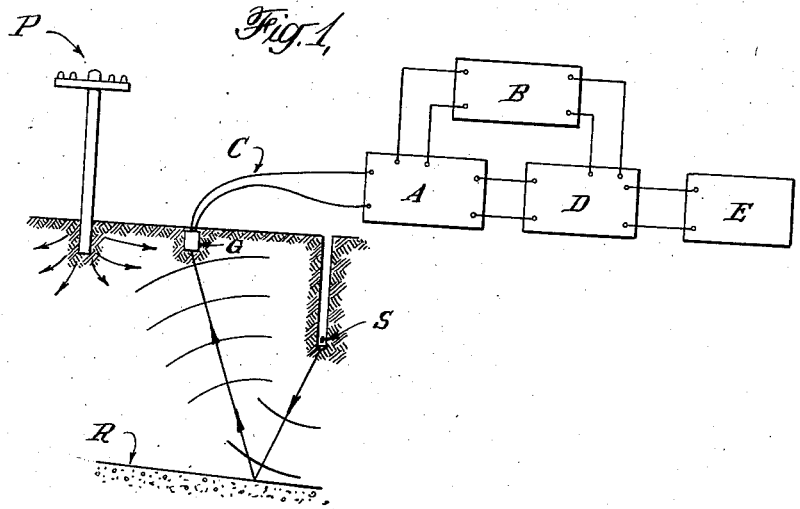
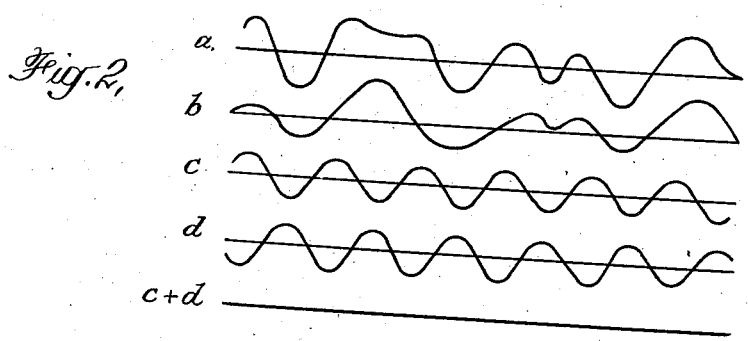
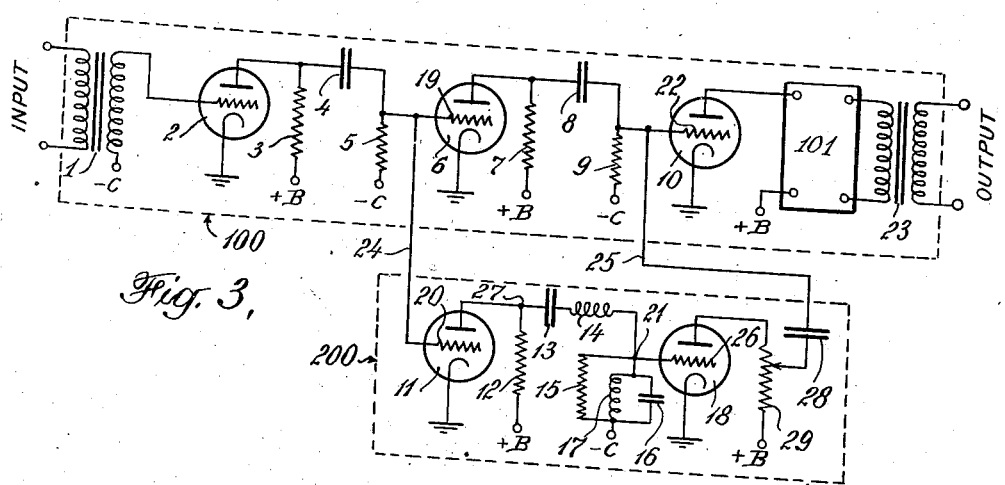
INVENTOR
CURTIS H. JOHNSON
BY James Y. Cleveland
ATTORNEY March 23, 1948.  C. H. JOHNSON  2,438,217
METHOD FOR ELIMINATION OF PERIODIC STRAY SIGNALS FROM SEISMIC SIGNALS
Filed June 30, 1944  2 Sheets-Sheet 2
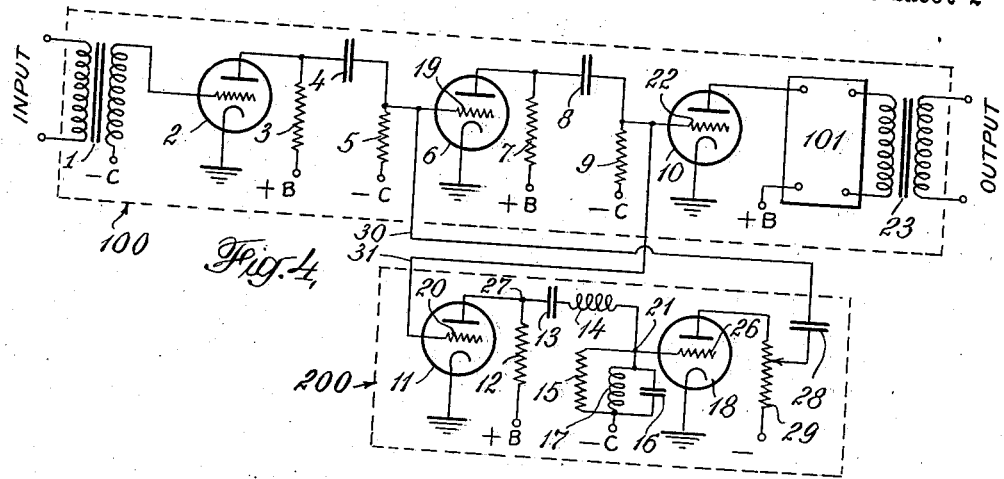
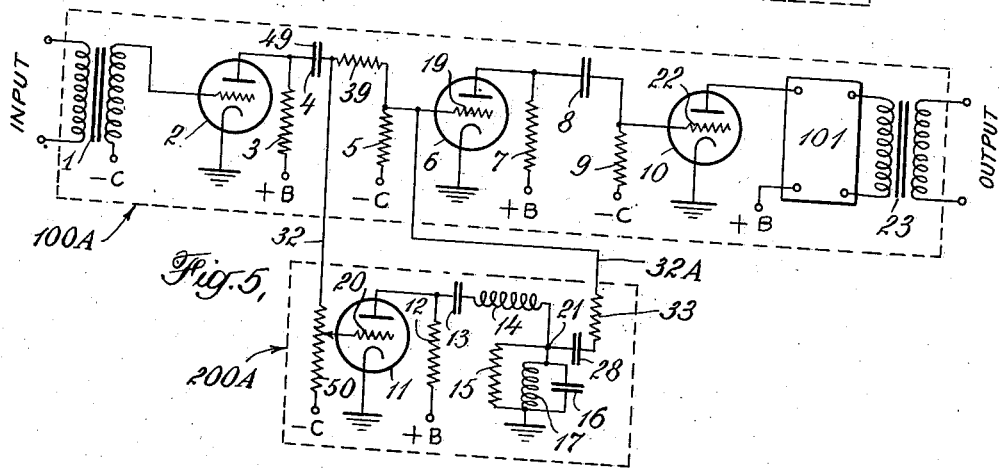
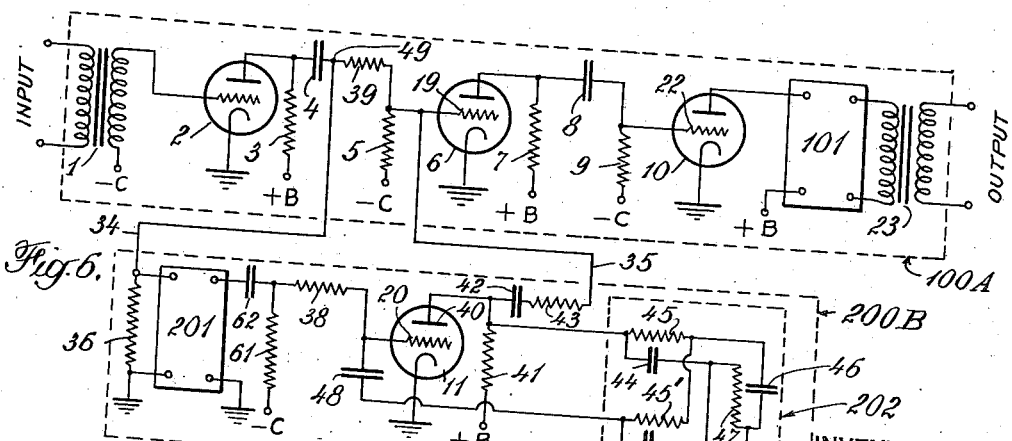
INVENTOR
CURTIS H. JOHNSON
BY James Y. Cleveland
ATTORNEY Patented Mar. 23, 1948

2,438,217

UNITED STATES PATENT OFFICE 2,438,217

METHOD FOR ELIMINATION OF PERIODIC STRAY SIGNALS FROM SEISMIC SIGNALS

Curtis H. Johnson, San Marino, Calif., assignor to Socony-Vacuum Oil Company, Incorporated, New York, N. Y., a corporation of New York Application June 30, 1944, Serial No. 543,035

1 Claim. (Cl. 179—171)

This invention relates to a method and apparatus for recording seismic waves and more particularly to the elimination of periodic stray signals from the seismic signals before they are recorded in the form of a trace or traces in co-ordination with time on a seismogram.

Seismic prospecting methods and apparatus have been known and used for many years. Refraction methods and apparatus have been in use for approximately twenty-five years while reflection methods and apparatus have been in use for at least fifteen years. During this time these methods and apparatus have been continuously developed and have reached a high degree of perfection, but one particular shortcoming, although recognized, has remained unremedied.

This shortcoming has been the tendency for the seismograph equipment, including seismometers, cables, truck bodies, amplifiers, etc., to pick up induced currents from the earth and the air which are amplified and recorded along with the electrical variations produced in the seismometers by the seismic waves, thus obscuring the true character of the seismic waves on the records.

The most objectionable of the periodic stray signals are those produced by induced currents from power transmission lines, usually 60 cycles. Due to the fact that all seismic prospecting equipment is made portable and is usually operated from a vehicle it is desirable, wherever possible, to conduct surveys along highways, and in these modern times many of the highways are flanked by power transmission lines. Additionally, it is often desirable to conduct a detailed survey of a portion of a producing structure. The results of such surveys are impaired by induced currents from the network of power transmission lines which supply power to the operating equipment.

Many attempts have been made to remove the objectionable signal components from the composite signal without success. Two principal schemes which have been incorporated in commercial seismograph equipment are the use of center-balancing potentiometers on the cables from the seismometers to the instrument in the truck and the use of amplifiers having a low response to the predominant frequency, usually 60 cycles, of the objectionable stray currents. Neither scheme has been successful in removing enough of the objectionable pick-up so that seismograph operations can proceed near power transmission lines, particularly during wet weather, without adversely affecting the quality of the seismograph records. The extreme case is in reflection surveying when the nature of the reflections in the particular territory requires, for best results, an amplifier having its response near the frequency of the objectionable stray currents.

A third scheme has been proposed which has not achieved such a degree of success as to be commercially practical, comprises purposely picking up some of the objectionable stray current, as by means of a loop antenna, adjusting the phase and amplitude of the predominant frequency until the purposely picked-up current of said frequency is exactly equal in amplitude and exactly 180° out of phase with the objectionable current of the same frequency unavoidably present in the seismic signal at any suitable point in one of the amplifiers, and then adding said adjusted purposely picked-up current to the seismic signal at said point, thereby cancelling the objectionable current of that frequency and leaving the seismic signal essentially free from any objectionable stray current of that frequency.

One skilled in the art can foresee that many practical difficulties will arise in adjusting the phase and amplitude of the predominant frequency of the purposely picked-up objectionable stray current. The problem is further complicated by the fact that there are from 8 to 24 similar and simultaneously operating amplifiers for which these adjustments must be made. Another reason for the practical failure of this last scheme is that the entire operation must be repeated every time the seismograph instruments are moved from one "set-up," or location to the next. Under normal working conditions from five to twenty such moves are made per day and thus the additional labor of making the adjustments described would no doubt seriously decrease the daily production of a field crew. Still another objection to the last method is that only the predominant frequency of the objectionable stray current is reduced.

The present invention not only is adapted to substantially eliminate or sufficiently reduce the amount of the predominant frequency but also the overtones or harmonics of that frequency. Normally the objectionable stray current consists of a predominant or fundamental frequency and several harmonics in objectionable magnitude. Therefore, for all practical purposes the instant invention will successfully eliminate all of the periodic objectionable stray currents generally encountered in seismic prospecting.

Broadly stated, this is accomplished by providing an auxiliary circuit that is connected to the amplifier of the equipment in such a way that a portion of the signal passing through the amplifier is introduced into the auxiliary circuit where the objectionable steady-state components of the diverted portion of the signal are substantially increased in volume relative to the remainder of the signal which is desired to be retained for recording or further modification in the amplifier, after which signals from the auxiliary circuit are re-introduced into the amplifier substantially 180° out of phase with the objectionable steady-state components originally present in the signal passing through the amplifier. The exact point and manner of introducing a portion of the amplifier signal into the auxiliary circuit may be varied through wide limits as will be evident to those skilled in the art. The exact manner and type of circuit employed to increase the amplitude of the objectionable steady-state components relative to the desired signal in the auxiliary circuit may also take many forms. The exact point and manner of re-introducing the signals from the auxiliary circuit into the amplifier substantially 180° out of phase with the desired signal may also be varied as will be evident to those skilled in the art.

Therefore, the object of the present invention resides in a method and apparatus for essentially eliminating or sufficiently reducing the magnitude of objectionable periodic stray currents, often associated with seismic signals, without adversely affecting the desired seismic signals and without requiring manual and repeated adjustments of the means employed.

Other objects and advantages of the present invention will become apparent from the following detailed description when considered with the drawings in which Figure 1 is a schematic showing of a seismic surveying operation employing the subject matter of the present invention;

Figure 2 is an illustration of this invention in terms of typical wave shapes of seismic signals and superimposed objectionable steady-state signals;

Figure 3 is a circuit diagram showing a conventional amplifier with auxiliary circuit in which a portion of the signals being amplified will be taken off just ahead of the second stage, fed into the auxiliary circuit, then returned to the amplifier just ahead of the third stage;

Figure 4 is a modified circuit diagram in which the signals fed to the auxiliary circuit are taken off just ahead of the third stage and returned to the amplifier just ahead of the second stage;

Figure 5 is a circuit diagram of still another modification of the present invention in which the signals fed to the auxiliary circuit are taken off of the plate circuit of the first stage just after the coupling condenser and returned just ahead of the second stage thereby necessitating the use of only one tube in the auxiliary circuit; and Figure 6 is a circuit diagram of still another modification of the present invention in which the signals for the auxiliary circuit are taken from and returned to the amplifier in the same manner as in Figure 5, but differs therefrom in that the auxiliary circuit includes a resistance-capacity network and a negative feed-back unit.

Referring to the drawings in detail, particularly Figure 1, there is schematically represented a reflection seismograph operation in the vicinity of a power transmission line. As is well understood in the reflection seismic surveying art, seismic waves are generated, as by a shot S, and are reflected from various underground strata, as reflecting stratum R. The reflected seismic energy moves geophone G within which the motion is transduced into an electrical signal. This signal is transmitted as by cables C to an amplifier A—D which amplifies and modifies the signal. From the amplifier the signal is delivered to recorder E, where a visual representation of the signal is made on a moving photographic strip in coordination with time or where, in some modifications of the method, a reproducible record is made upon a suitable moving medium.

As pointed out above, in many areas where seismic surveys are made, sources, such as power transmission line P, of extraneoues objectionable electro-magnetic energy are present. When this occurs, objectionable currents, usually steady-state and frequently approaching a pure sine wave, are induced in the geophones, the cables, or in other parts of the circuits and are amplified and recorded along with the signal of seismic origin. When this occurs, the superposition of the electrical signal on the seismic signal makes interpretation of the record in terms of seismic wave arrival times and wave shapes difficult or impossible.

The disturbing extraneous signal need not be from power lines or other electro-magnetic sources; frequently the poles of high voltage lines vibrate at the frequency of the current carried by the power line. Such vibration can readily disturb a nearby geophone giving rise to an objectionable steady-state signal which will be superimposed on the desired seismic signal. Other mechanical sources of substantially steady-state interference will occur to those skilled in the art. These extraneous signals have been particularly difficult to remove by methods in operation or under trial prior to this invention, since the desired seismic signal and the interfering signal both exist in the earth and move the geophones in accordance with their combined wave shape. Methods designed to prevent or balance out electro-magnetic pick-up were entirely unable to reduce pick-up having its origin in the vibrations of the ground.

Amplifier A—D of Figure 1 is shown separated into two parts A and D to illustrate the by-passing or diverting of a portion of the signal to pass through the auxiliary circuit B.

Auxiliary circuit B is so designed that it effectively blocks or absorbs the seismic signal which it receives, while passing, or even amplifying the objectionable steady-state signal it receives. Circuit B also affects the phase of the steady-state signal so that, with due regard for the point and manner of re-introducing the signal from circuit B into amplifier A—D, the re-introduced steady-state signal will be substantially 180° out of phase with the steady-state signal present at that point.

For a clear understanding of the detailed descriptions of the circuits that follow reference is made to Figure 2 in which $a$ represents a composite or total signal passing through the amplifier A—D. This signal may be considered as being made up of the separate signal $b$, the seismic signal desired, and the unwanted steady-state signal $c$ of non-seismic origin. After a portion of composite signal $a$ is passed through auxiliary circuit B where the seismic signal $b$ is removed and the remaining signal is reversed in phase 180° as shown at $d$, it is reintroduced into the amplifier A—D. The reversal in phase effectively places a trough of $d$ opposite a crest of $c$ so that, in the ideal case, $d=(-c)$. Upon re-introducing $d$ into the amplifier circuit it is combined with $a$. Thus the end product $E$ of the amplifier A—D is $E = a + d$, but
$d = (-c)$ and $a = b + c$, therefore
$E = (b + c) - c$, or
$E = b$, the desired seismic signal.

In Figure 3 there is shown diagrammatically a typical resistance coupled amplifier consisting of input transformer 1; amplifying tubes 2, 6 and 10; plate resistors 3 and 7; coupling condensers 4 and 8; grid resistors 5 and 9, frequency selective amplitude controlling and stabilizing circuits 101 that are common in the art; and output transformer 23.

The auxiliary circuit 200 consists of amplifying tubes 11 and 18, plate resistor 12, combined plate resistor and potentiometer 29, grid resistor 15, coupling condenser 28, condensers 13 and 16, and inductance coils 14 and 17. Lead 24 connects grid 19 of amplifying tube 6 to grid 20 of amplifying tube 11, and lead 25 connects coupling condenser 28 to grid 22 of tube 6.

A signal voltage, for example, as shown by $a$ of Figure 2, is conducted to grid 20 of tube 11 by conductor 24 from the amplifier. This signal voltage is amplified and changed 180° in polarity by tube 11. The signal voltage appearing across plate resistor 12 also appears across the impedance consisting of grid resistor 15, condensers 13 and 16 and inductance coils 14 and 17. That portion of this voltage existing between terminal 21 and ground is impressed on grid 26 of tube 18. Condenser 13 and inductance coil 14 are of such capacity and inductance respectively, that the combination has its resonant frequency at the frequency of the objectionable component shown, for example, as $c$ in Figure 2. Condenser 16 and inductance coil 17 are of such capacity and inductance respectively, that the combination as connected is in anti-resonance at the same frequency.

Under these conditions the voltage on grid 26 is high for the resonant frequency, for which there is substantially no phase change from the voltage on the plate of tube 11. For frequencies greater or less than resonant frequency the impedance from point 27 to point 21 increases sharply while the impedance from 21 to ground decreases sharply. Thus, the voltage on grid 26 decreases sharply for frequencies above and below the resonant frequency and the amplified voltage across plate resistor 29 of tube 18 consists predominantly of the resonant frequency, for example, the component $c$ of Figure 2, changed another 180° in phase, or a total of 360° in phase with respect to the $c$ component of voltage appearing across grids 19 and 20 of tubes 6 and 11, respectively.

The original signal $a$ passing through tube 6 appears across plate resistor 7 as a voltage of approximately the same wave shape as on grid 19, but with all components, including $c$ changed 180° in phase. This is passed without substantial alteration to grid 22 of tube 10 through coupling condenser 8.

A component of voltage $c$, equal in magnitude to that contributed by plate resistor 7 to grid 22 of tube 10 is introduced from plate resistor 29 to grid 22 through coupling condenser 28. The magnitude of this component can be varied by the potentiometer action of plate resistor 29. This voltage component $c$, 360° out of phase with the $c$ component on grid 19, then adds to the equal voltage of component $c$ derived via tube 6, 180° out of phase with the $c$ component voltage on grid 19, resulting in substantial elimination of the objectionable $c$ signal component on grid 22. Thus, signal $c$ has been substantially removed from signal $a$ leaving only signal $b$ to be acted upon by succeeding portions of the amplifier A—D and finally recorded without the interference of signal $c$.

In the modification shown by Figure 4 all of the elements of the amplifier and auxiliary circuit are the same as in Figure 3. However, in this modification that portion of the signals fed to the auxiliary circuit are taken off of the grid lead of grid 22 of tube 10 and re-introduced via the grid 19 of tube 6, i. e., in Figure 3 the signal voltage was taken from an early stage of the amplifier and, after treating it by the auxiliary circuit, returned the out-of-phase $c$ component to a later stage in the amplifier A—D, while in Figure 4 the signal voltage is taken off of a late stage, treated by the auxiliary circuit, and the out-of-phase component $c$ is returned to an earlier stage of the amplifier A—D.

Using the circuit of Figure 3 it is theoretically possible to completely cancel component $c$ from signal $a$. However, if too little voltage is fed from plate resistor 29 to grid 22, component $c$ will be only partially cancelled and, if too much voltage is fed from plate resistor 29 to grid 22, minus $c$ component will remain after the positive $c$ component has been cancelled.

The circuit of Figure 4 cannot theoretically completely cancel component $c$ from signal $a$, for the more completely $c$ is cancelled on grid 19, the less $c$ component will be available at grid 22 to be treated by the auxiliary circuit and be available at grid 19 for cancellation purposes. However, it is theoretically impossible to over-cancel, leaving a residue of minus $c$ component as can be done with the circuit of Figure 3. Thus, the circuit of Figure 4 may be preferred under some conditions due to its inherent stability occasioned by negative feed-back.

In the modification shown in Figure 5 the total signal voltage $a$ is transferred from 49 in the amplifier, at the same phase as grid 19 of tube 6, through the lead 32 to grid 20 of tube 11 of the auxiliary circuit, and the treated component $c$ is returned to the amplifier from terminal 21 through condenser 28 and resistor 33 to the same grid 19 of tube 6. The point of take-off 49 and the point of return grid 19 are separated by a suitable resistance 39. The terminal 21 in the auxiliary circuit is connected to grid 26 of tube 18 in Figures 3 and 4 but not in Figure 5. Therefore, the auxiliary circuit arrangement of Figure 5 dispenses with the second tube 18. In this circuit the negative feed-back to grid 19 of tube 6 is controlled by the relative magnitude of resistors 33 and 5, the amplitude of negative feed-back to grid 20 of tube 11 is determined by the relative magnitude of resistances 39 and 3, while the amplitude of both feed-backs is determined by potentiometer 50.

Complete cancellation of the component $c$ is theoretically possible with the circuit of Figure 5 by the proper choice of resistors 33, 39, 3 and 5. However, as with the circuit of Figure 3 cancellation can be exceeded and a minus $c$ component introduced.

In place of the frequency discrimination provided in Figures 3, 4 and 5 by resonant circuits composed of inductance and capacitance, any other combination of elements achieving the same frequency discrimination may be employed, provided the total phase change from input lead of the auxiliary circuit to output lead of the auxiliary circuit is 180° different for signal component c than the total phase change in amplifier A—D between the points of connection of these leads.

In Figure 6 there is shown a still further modified form of auxiliary circuit which employs only resistive and capacitive networks. Signal voltage is taken from and returned to the amplifier in the same manner as in the circuit diagram of Figure 5. The auxiliary circuit is composed of resistors 36, 61, 38, 45, 45', 41, 43 and 47; condensers 42, 62, 44, 44', 46 and 48; resistive-capacitive network 201; and tube 11. In this modification the relative amplitudes of negative feed-back to grid 19 and to lead 34 are determined by the relative magnitude of resistors 43 and 5, and 39 and the combination of 3 and 36, respectively. By the choice of these values the degree of cancellation and the stability may be selected. The resistive-capacitive network 201 of reiterated "T" or "TT" sections, well-known in the art, serves to reduce the over-all gain of the auxiliary circuit and to obtain a moderate discrimination in favor of the frequency component c while introducing substantially no phase change at the frequency of component c.

The principal means for selectively amplifying the signal component c comprises the sub-unit 202, which, with blocking condenser 48, is connected from plate 40 to grid 20, both in tube 11. Sub-unit 202 is so arranged as to provide negative feed-back across tube 11 at all frequencies except the frequency of signal component c, thus inhibiting the amplification of all frequencies except that of component c. This is accomplished if, at the frequency of component c, the absolute values of impedance of condensers 44 and 44' and of resistors 45 and 45' are equal and are also equal to twice the absolute values of the impedances of condenser 46 and resistor 47.

Frequently harmonics of the signal component c are present in the amplifier. One way of eliminating these objectionable harmonics is to provide the amplifier with additional auxiliary circuits for treatment of the harmonics in the same manner as the signal component c, each additional auxiliary circuit being assigned to a particular harmonic. Since the third harmonic is usually the only offender it is often quite practical to use only two auxiliary circuits, one for the fundamental c signal component and one for the frequency of the third harmonic.

It is generally accepted that the usual cause of a third harmonic is a tendency for the objectionable signal wave to be square on top and bottom. If a substantially square top and square bottom wave is delivered from the auxiliary circuit to the amplifier, substantial cancellation of the signal component c and all of its odd harmonics will be obtained. Only a slight squaring of the shape of the output wave from the auxiliary circuit is necessary. This can be done by operating tube 18 of the auxiliary circuits of Figures 3 and 4 with a low heater current so "electron saturation" occurs to flatten the peaks and by operating the same tube so far down on the grid curve that the troughs of the waves are flattened.

The modification of the auxiliary circuit shown in Figure 6 lends itself to the production of a wave which contains not only the steady-state frequency, component c, but also the third and other odd harmonics of the component c. This is accomplished by the insertion of a non-linear impedance from a point between condenser 42 and resistor 43 of Figure 6 to the negative terminal of the grid bias battery or its equivalent. The non-linear impedance should have the characteristic that as the absolute value of the voltage across its terminals is increased its impedance decreases. One such non-linear resistance is commonly used in lightning arrestors. Others will suggest themselves to those skilled in the art.

The auxiliary circuit of Figure 6 can be further modified to produce a wave containing odd harmonics by replacing resistor 43 with a non-linear impedance which increases as the voltage across it increases positively or negatively. Such an impedance is a two element vacuum tube operated so that both the peaks and the troughs of the signal component c put out by tube 11 run off the straight line portion of the two element tube's voltage-current curve. Here also other types of non-linear impedances will suggest themselves to those skilled in the art.

This invention is not to be limited by the specific discussion in the foregoing, but only by such limitations as are expressed in the appended claim.

I claim:

A method of eliminating a fundamental undesired steady-state signal and its odd harmonics from a signal that it is desired to record that comprises the steps of introducing the composite signal into a main amplifier, diverting a portion of the composite signal from the amplifier to an auxiliary circuit, there amplifying the fundamental steady-state signal relative to the remainder of the composite signal, thereafter in the auxiliary circuit distorting the fundamental steady-state signal to introduce odd harmonics thereof, returning the amplified steady-state signal and its odd harmonics to the main amplifier respectively 180° out of phase with the fundamental steady-state signal and its odd harmonics in the undiverted portion to effect substantial cancellation of the steady-state signals whereby the output signal of the main amplifier will be substantially free of the steady-state signal and its odd harmonics.

CURTIS H. JOHNSON.

REFERENCES CITED

The following references are of record in the file of this patent:

UNITED STATES PATENTS

| Number | Name | Date |
|---|---|---|
| 1,519,211 | Martin | Dec. 16, 1924 |
| 1,544,622 | Affel | July 7, 1925 |
| 2,015,082 | Meyers | Sept. 24, 1935 |
| 2,073,477 | Green | Mar. 9, 1937 |
| 2,161,418 | Jones | June 6, 1939 |
| 2,164,196 | Woodyard et al. | June 27, 1939 |
| 2,245,365 | Riddle, Jr. | June 10, 1941 |
| 2,247,246 | Lindsay et al. | June 24, 1941 |
| 2,263,519 | Ritzmann | Nov. 18, 1941 |
| 2,294,627 | Parr | Sept. 1, 1942 |
| 2,305,543 | McCarty | Dec. 15, 1942 |
| 2,346,369 | Eisler | Apr. 11, 1944 |
| 2,372,419 | Ford et al. | Mar. 27, 1945 |